(12) United States Patent
Jeong et al.

(10) Patent No.: US 12,503,096 B2
(45) Date of Patent: Dec. 23, 2025

(54) CONTROL METHOD FOR DRIVING SERIES MODE OF HYBRID VEHICLE

(71) Applicants: Hyundai Motor Company, Seoul (KR); Kia Corporation, Seoul (KR)

(72) Inventors: Min Gi Jeong, Seoul (KR); Hyeon Jun Lee, Suwon-Si (KR); Dong Jun Shin, Hwaseong-Si (KR); Min Seok Song, Gwacheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 319 days.

(21) Appl. No.: 18/095,872

(22) Filed: Jan. 11, 2023

(65) Prior Publication Data

US 2024/0010182 A1    Jan. 11, 2024

(30) Foreign Application Priority Data

Jul. 11, 2022    (KR) .......................... 10-2022-0084740

(51) Int. Cl.
*B60W 20/10* (2016.01)
*B60K 6/46* (2007.10)
*B60K 6/52* (2007.10)

(52) U.S. Cl.
CPC .............. *B60W 20/10* (2013.01); *B60K 6/46* (2013.01); *B60K 6/52* (2013.01);
(Continued)

(58) Field of Classification Search
CPC ......... B60W 20/10; B60W 2510/0657; B60W 2510/085; B60W 2510/1005;
(Continued)

(56) References Cited

U.S. PATENT DOCUMENTS 10,384,527 B2    8/2019  Frank et al.
10,543,739 B1    1/2020  Zhou
(Continued)

FOREIGN PATENT DOCUMENTS

JP    2019-077212 A    5/2019
JP    2020-192828 A    12/2020
(Continued)

OTHER PUBLICATIONS

Engineering ToolBox, (2011). Car—Required Power and Torque. [online] Available at: https://www.engineeringtoolbox.com/cars-power-torque-d_1784.html [Sep. 22, 2020]. (Year: 2020).*

*Primary Examiner* — Tiffany P Young
*Assistant Examiner* — Ashleigh Nicole Turnbaugh
(74) *Attorney, Agent, or Firm* — Morgan Lewis & Bockius LLP

(57) ABSTRACT

A control method for driving series mode of a hybrid vehicle is suitable for a four-wheel drive powertrain of a hybrid vehicle and can further improve a charging efficiency by implementing a second series mode, in which a vehicle is driven by a second motor for driving rear wheels, which is employed for a four-wheel drive powertrain of a hybrid vehicle, and an energy storage device is charged by power generation operation of a first motor connected to an engine through an engine clutch, beside a first series mode in which a vehicle is driven by the first motor and the energy storage device is charged by power generation operation of a third motor directly connected to the engine so that the first series mode or the second series mode may be selected in accordance with driver request power and charge power for the energy storage device.

20 Claims, 4 Drawing Sheets

(52) U.S. Cl.
CPC ............... *B60W 2510/0657* (2013.01); *B60W 2510/085* (2013.01); *B60W 2510/1005* (2013.01); *B60W 2520/10* (2013.01); *B60W 2520/403* (2013.01); *B60W 2720/403* (2013.01); *B60Y 2200/92* (2013.01)

(58) Field of Classification Search
CPC ....... B60W 2520/10; B60W 2520/403; B60W 2720/403; B60W 20/11; B60W 20/20; B60W 20/15; B60W 2510/08; B60W 2710/08; B60K 6/46; B60K 6/52; B60K 6/387; B60K 6/547; B60K 2006/4825; B60K 6/448; B60Y 2200/92; Y02T 10/62
USPC .......................................................... 701/22
See application file for complete search history.

(56) References Cited

U.S. PATENT DOCUMENTS

| | | | |
|---|---|---|---|
| 2014/0054100 A1* | 2/2014 | Boskovitch | B60K 6/52 |
| | | | 180/242 |
| 2015/0210266 A1* | 7/2015 | Yang | B60K 6/387 |
| | | | 180/65.23 |
| 2020/0172081 A1* | 6/2020 | Sakayanagi | B60W 40/105 |
| 2020/0384859 A1* | 12/2020 | Higuchi | B60K 35/00 |
| 2024/0157932 A1* | 5/2024 | Tomoda | B60W 20/10 |

FOREIGN PATENT DOCUMENTS

| | | |
|---|---|---|
| JP | 2020-203553 A | 12/2020 |
| KR | 2014-0005402 A | 1/2014 |

\* cited by examiner

CONTROL METHOD FOR DRIVING SERIES MODE OF HYBRID VEHICLE

CROSS REFERENCE TO RELATED APPLICATION

The present application claims priority to Korean Patent Application No. 10-2022-0084740, filed Jul. 11, 2022, the entire contents of which is incorporated herein for all purposes by this reference.

BACKGROUND OF THE PRESENT DISCLOSURE

Field of the Present Disclosure

The present disclosure relates to a control method for driving series mode of a hybrid vehicle, and more particularly, to a control method for driving series of a four-wheel drive hybrid vehicle which is driven by power from a motor while a battery is charged with power from an engine.

Description of Related Art

As well known in the art, a hybrid vehicle, an electric vehicle, a hydrogen fuel cell vehicle, etc. are provided with an electric motor as a driving source and these vehicles are called electrified vehicles.

A hybrid vehicle of these electrified vehicles may be provided with a four-wheel drive powertrain, which includes motors connected to front wheels and rear wheels to be able to transmit power, as a driving source besides an engine.

FIG. 1 of the accompanying drawings shows a powertrain system of a four-wheel drive (4WD, Electronic-4 Wheel Drive) hybrid vehicle in which a front wheel powertrain including an engine and a first motor, and a rear wheel powertrain including a second motor are combined.

The four-wheel drive powertrain of a hybrid vehicle, as shown in FIG. 1, may include an engine 10 and a first motor 21 for driving front wheels, an engine clutch 12 disposed between the engine 10 and the first motor 21 and transmitting or disconnecting engine power, a transmission 30 shifting gears and outputting power from the first motor 21, etc. to front wheels 40, a second motor 22 for driving rear wheels, a reducer 50 reducing and outputting power from the second motor 22 to rear wheels 60, a third motor 23 connected to the crank pulley of the engine 10 and being driven to start the engine and to perform power generation operation for charging a battery, etc.

The first motor 21 is connected to an energy storage device 80 so that charging and discharging are possible by a first converter 71 for power conversion, the second motor 22 is connected to the energy storage device 80 so that charging and discharging are possible by a second inverter 72, and the third motor 23 is connected to the energy storage device 80 so that charging and discharging are possible by a third inverter 73.

The energy storage device 80 may be a battery, a capacitor, or the like.

As control units for controlling driving of the four-wheel drive powertrain of a hybrid vehicle, as shown in FIG. 2, a hybrid control unit (HCU) 100 which is the uppermost control unit, an engine control unit 110 that is configured to control general driving, an operation point, etc. of an engine in response to an instruction from the hybrid control unit 100, a motor controller 120 that is configured to control general driving of the first motor 21 and the second motor 22 in response to a torque instruction from the hybrid control unit 100, a power generation controller 130 that is configured to control driving of the third motor 23 in response to an instruction from the hybrid control unit 100, etc. may be used.

A battery control unit 140 may be used to manage charging and discharging amounts, etc. of the energy storage device 80, and a shift controller 150 may be used to control shifting by the transmission 30.

A hybrid vehicle having the four-wheel drive powertrain can provide a series mode in which the energy storage device is charged by power generation operation of the third motor 23 using a driving force from the engine 10 and simultaneously the hybrid vehicle is driven by a driving force from the first motor 21 with the engine clutch 12 disengaged when it is required to charge the energy storage device while the vehicle is driven.

In more detail, in the series mode, power from the first motor 21 is transmitted to the front wheels 40 through the transmission 30 with the engine clutch 12 disengaged (see the driving line in FIG. 1), so that the vehicle is driven, and simultaneously, power generated by driving of the engine 10 is transmitted to the third motor 23 and the third motor 23 is driven as a generator, whereby the power generated by the third motor 23 may be easily accumulated in the energy storage device 80 (see the charging line in FIG. 1).

In the present process, the second motor 22 and the reducer 50 are maintained in a non-load drag state in which they are rotated without torque applied.

However, the series mode of the related art, in which a vehicle is driven by a driving force from the first motor 21 and the energy storage device 80 is charged by power generation operation of the third motor 23 using power generated by idling of the engine 10, has a problem that because the second motor 22 and the reducer 50 are maintained in a non-load drag state, a physical loss is accompanied, and accordingly, the charging efficiency decreases.

Furthermore, because there is only a series mode in which the energy storage device 80 is charged by power generation operation of the third motor 23 directly connected to the engine even though the second motor 22 for driving rear wheels are added for a four-wheel drive powertrain of a hybrid vehicle, there is a demand for a method of implementing another series mode which is suitable for a four-wheel drive powertrain of a hybrid vehicle and can further improve a charging efficiency.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a control method for driving series mode of a hybrid vehicle, the method being suitable for a four-wheel drive powertrain of a hybrid vehicle and configured to further improve a charging efficiency by implementing a second series mode, in which a vehicle is driven by a second motor configured for driving rear wheels, which is employed for a four-wheel drive powertrain of a hybrid vehicle, and an energy storage device is charged by power generation operation of a first motor connected to an engine through an engine clutch, beside a first series mode in which a vehicle is driven by the first motor and the energy storage device is charged by power generation operation of a third motor directly connected to the engine so that the first series mode or the second series mode may be selected in accordance with a power consumption amount which is determined based on driver request power, charge power for the energy storage device, etc.

To achieve the objective, the present disclosure provides a control method for driving series mode of a hybrid vehicle including an engine and a first motor configured for driving front wheels, an engine clutch disposed between the engine and the first motor, a second motor configured for driving rear wheels, and a third motor configured for power generation operation connected to the engine, the method including: determining whether to enter the series mode when the hybrid vehicle is driven; determining a first power consumption amount or a first energy efficiency according to driving of the first motor and the third motor, and a second power consumption amount or a second energy efficiency according to driving of the first motor and the second motor; and performing one of a first series mode that utilizes the driving of the first motor and the third motor or a second series mode that utilizes the driving of the first motor and the second motor by comparing the first power consumption amount and the second power consumption amount with each other or comparing the first energy efficiency and the second energy efficiency with each other.

The first series mode that utilizes the driving of the first motor and the third motor may be selected and performed when the first power consumption amount is smaller than the second power consumption amount or when the first energy efficiency is higher than the second energy efficiency.

The second series mode that utilizes the driving of the first motor and the second motor may be selected and performed when the second power consumption amount is smaller than the first power consumption amount or when the second energy efficiency is higher than the first energy efficiency.

The control method may further include checking whether the hybrid vehicle is driven in a four-wheel drive type before the determination of the first power consumption amount or the first energy efficiency and the second power consumption amount or the second energy efficiency, when it is determined by the control unit to enter the series mode.

The determination of the first power consumption amount or the first energy efficiency and the second power consumption amount or the second energy efficiency may be performed when the hybrid vehicle is being driven in a four-wheel drive type.

The first power consumption amount may be determined as a value obtained by subtracting charge power of the third motor from driving power of the first motor.

The driving power of the first motor may be obtained from the following equation 1 for each shifting range of a transmission, driving power of first motor=[(wheel request power/vehicle speed)+(non-load drag of reducer+non-load drag of second motor)]×rpm of first motor/(transmission efficiency×driving efficiency of first motor).   (equation 1):

The charge power of the third motor may be differently determined in accordance with an engine driving torque.

The second power consumption amount may be determined as a value obtained by subtracting charge power of the first motor from driving power of the second motor.

The driving power of the second motor is obtained from the following equation 2, driving power of second motor=[(wheel request power/vehicle speed)+(non-load drag of transmission)]×rpm of second motor/(reducer efficiency×driving efficiency of second motor).   (equation 2):

The charge power of the first motor may be differently determined in accordance with an engine driving torque.

As the first series mode is performed, an energy storage device may be charged by power generation operation of the third motor using an idling driving force of the engine and simultaneously the hybrid vehicle may be driven by a driving force from the first motor with the engine clutch disengaged; and when the first series mode is performed, the second motor and a reducer may be maintained in a non-load drag state.

As the second series mode is performed, an energy storage device may be charged by power generation operation of the first motor using a driving force of the engine and simultaneously the hybrid vehicle may be driven by a driving force from the second motor with the engine clutch engaged; and when the second series mode is performed, a transmission connected to an output shaft of the first motor may be maintained in a non-load drag state at an N-stage.

The present disclosure provides the following effects through the objectives described above.

First, because the first series mode or the second series mode, in which driving and charging are differently performed, depending on a power consumption amount which is determined in accordance with driver request power, charge power for the energy storage device, etc., may be selected, it is possible to provide a series mode which is suitable for a four-wheel drive powertrain of a hybrid vehicle and can further improve charging efficiency.

Because the first series mode or the second series mode is selected in consideration of the driving efficiency and charging efficiency of the first, second, and third motor according to shifting or decelerating, and objective parts for a non-load drag in a series mode, it is possible to reduce a physical loss due to a non-load drag and to improve fuel efficiency by increasing driving and charging efficiency of the motors.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
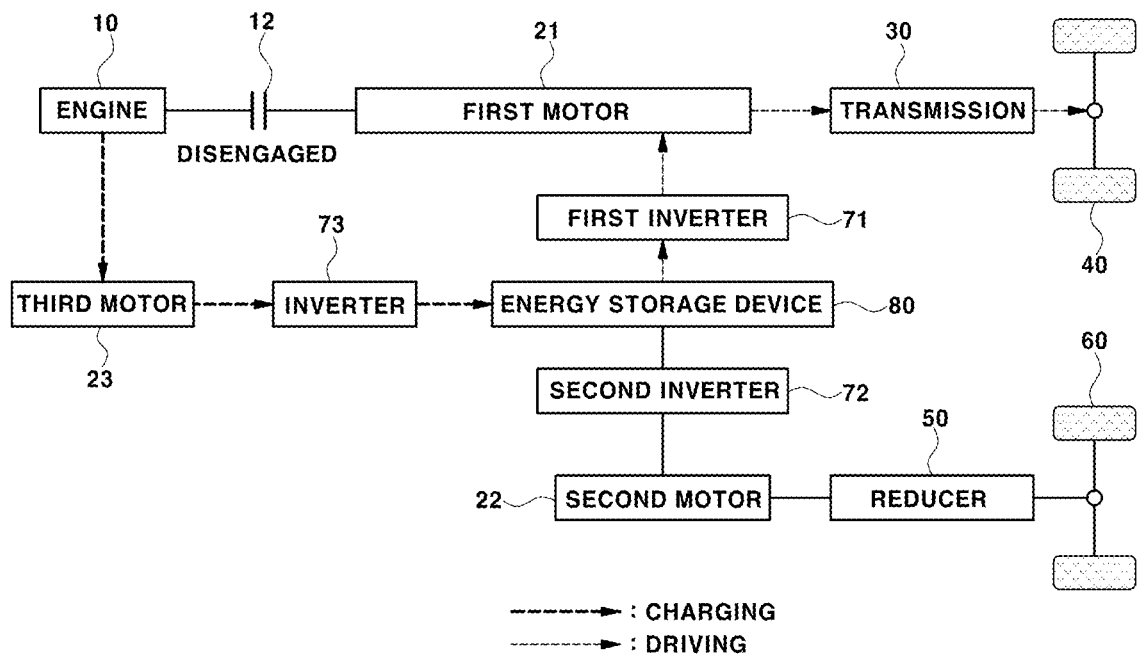
FIG. 1 is a schematic diagram for a control method for driving series mode of a hybrid vehicle according to an exemplary embodiment of the present disclosure and shows charging an energy storage device and driving flow for driving when a first series mode is selected.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings.

Figure 3:
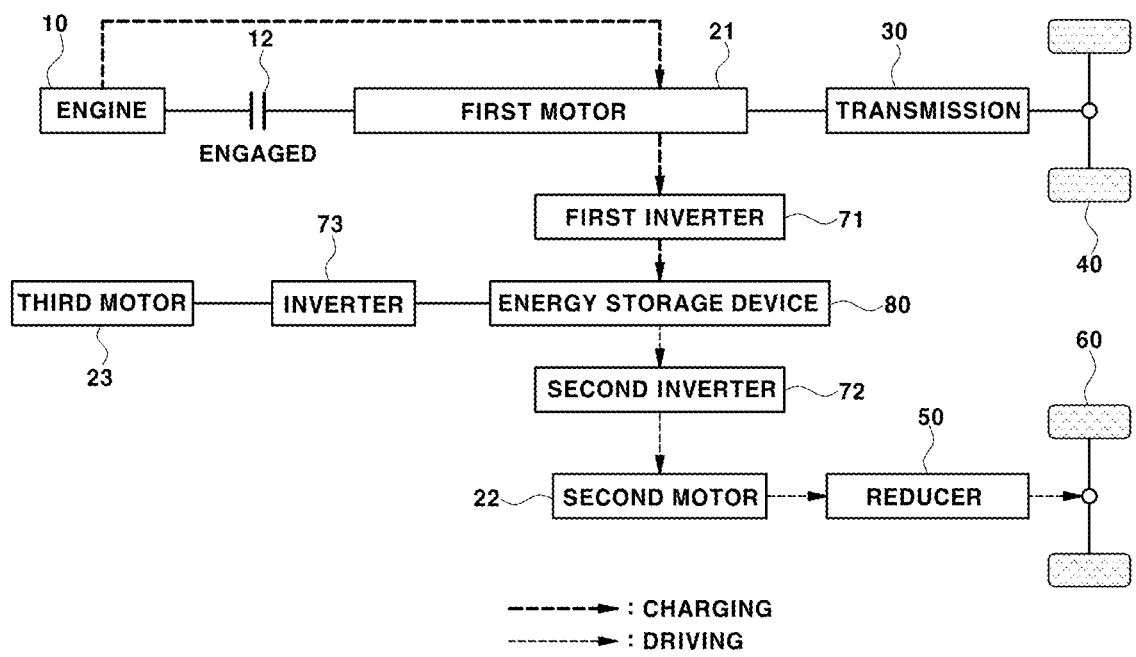
FIG. 3 is a schematic diagram for a control method for driving series mode of a hybrid vehicle according to an exemplary embodiment of the present disclosure and shows charging an energy storage device and driving flow for driving when a second series mode is selected.

A four-wheel drive powertrain of a hybrid vehicle, as shown in FIGS. 1 and 3, may include an engine 10 and a first motor 21 for driving front wheels, an engine clutch 12 disposed between the engine 10 and the first motor 21 and transmitting or disconnecting engine power, a transmission 30 shifting gears and outputting power from the first motor 21, etc. to front wheels 40, a second motor 22 for driving rear wheels, a reducer 50 reducing and outputting power from the second motor 22 to rear wheels 60, a third motor 23 connected to a crank pulley of the engine 10 and operating to start the engine and to perform power generation operation for charging a battery, etc.

The first motor 21 is connected to an energy storage device 80 so that charging and discharging are possible by a first converter 71 for power conversion, the second motor 22 is connected to the energy storage device 80 so that charging and discharging are possible by a second inverter 72, and the third motor 23 is connected to the energy storage device 80 so that charging and discharging are possible by a third inverter 73.

The energy storage device 80 may be a battery, a capacitor, or the like.

Figure 2:
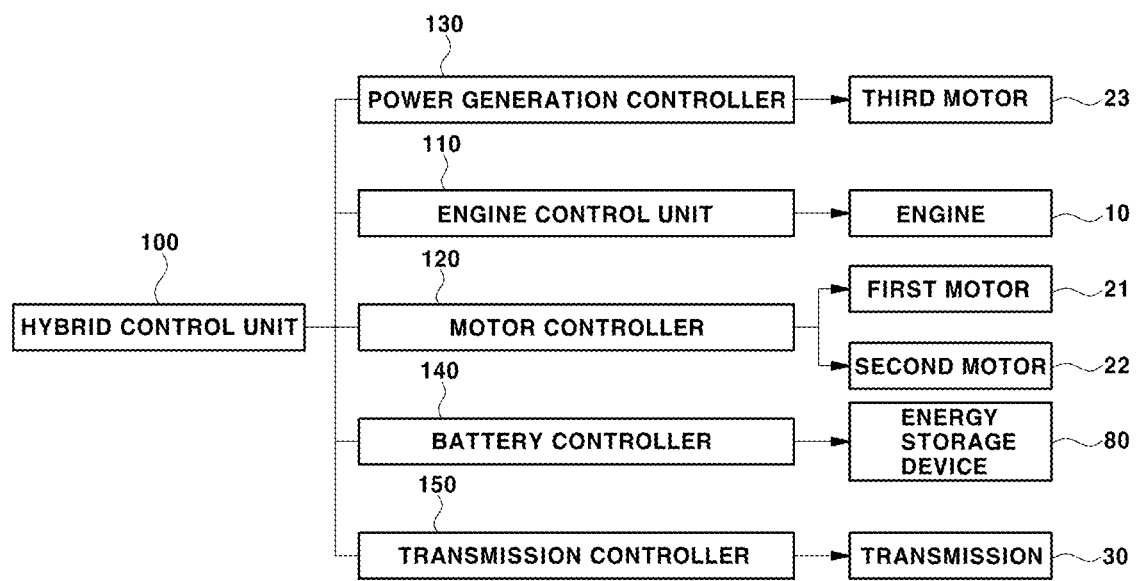
FIG. 2 is a control schematic diagram for a control method for driving series mode of a hybrid vehicle according to an exemplary embodiment of the present disclosure.

As control units for controlling driving of the four-wheel drive powertrain of a hybrid vehicle, as shown in FIG. 2, a hybrid control unit (HCU) 100 which is the uppermost control unit, an engine control unit 110 that is configured to control general driving, an operation point, etc. of an engine in response to an instruction from the hybrid control unit 100, a motor controller 120 that is configured to control general driving of the first motor 21 and the second motor 22 in response to a torque instruction from the hybrid control unit 100, a power generation controller 130 that is configured to control driving of the third motor 23 in response to an instruction from the hybrid control unit 100, etc. may be used.

A battery control unit 140 may be used to manage charging and discharging amounts, etc. of the energy storage device 80, and a shift controller 150 may be used to control shifting by the transmission 30.

Accordingly, the four-wheel drive powertrain of a hybrid vehicle including the present configuration can provide a front-wheel driving mode in which the vehicle is driven by driving forces from the engine 10 and the first driving motor 21, a rear-wheel driving mode in which the vehicle is driven by a driving force from the second motor 22, and a four-wheel driving mode in which the vehicle is driven by both of the driving forces from the first motor 21 and the second motor 22, depending on driver request power and charge power for the energy storage device while the vehicle is driven.

Of course, when a hybrid vehicle coasts or is decelerated, the energy storage device 80 may be charged by regenerative braking of the first motor 21 and the second motor 22.

The present disclosure is characterized in that while a hybrid vehicle including a four-wheel drive powertrain is driven, a first series mode, in which the energy storage device 80 is charged by power generation operation of the third motor 23 using an idling driving force of the engine 10 and simultaneously the vehicle is driven by a driving force from the first motor 21 with the engine clutch 12 disengaged, is selected or a second series mode, in which the energy storage device 80 is charged by power generation operation of the first motor 21 using a driving force from the engine 10 and simultaneously the vehicle is driven by a driving force from the second motor configured for driving rear wheels with the engine clutch 12 engaged, is selected, depending on energy efficiency and a power consumption amount that are determined based on driver request power, charge power for the energy storage device, etc.

A control method for driving series mode of a hybrid vehicle according to an exemplary embodiment of the present disclosure which is performed on the configuration described above is sequentially described.

Figure 4:
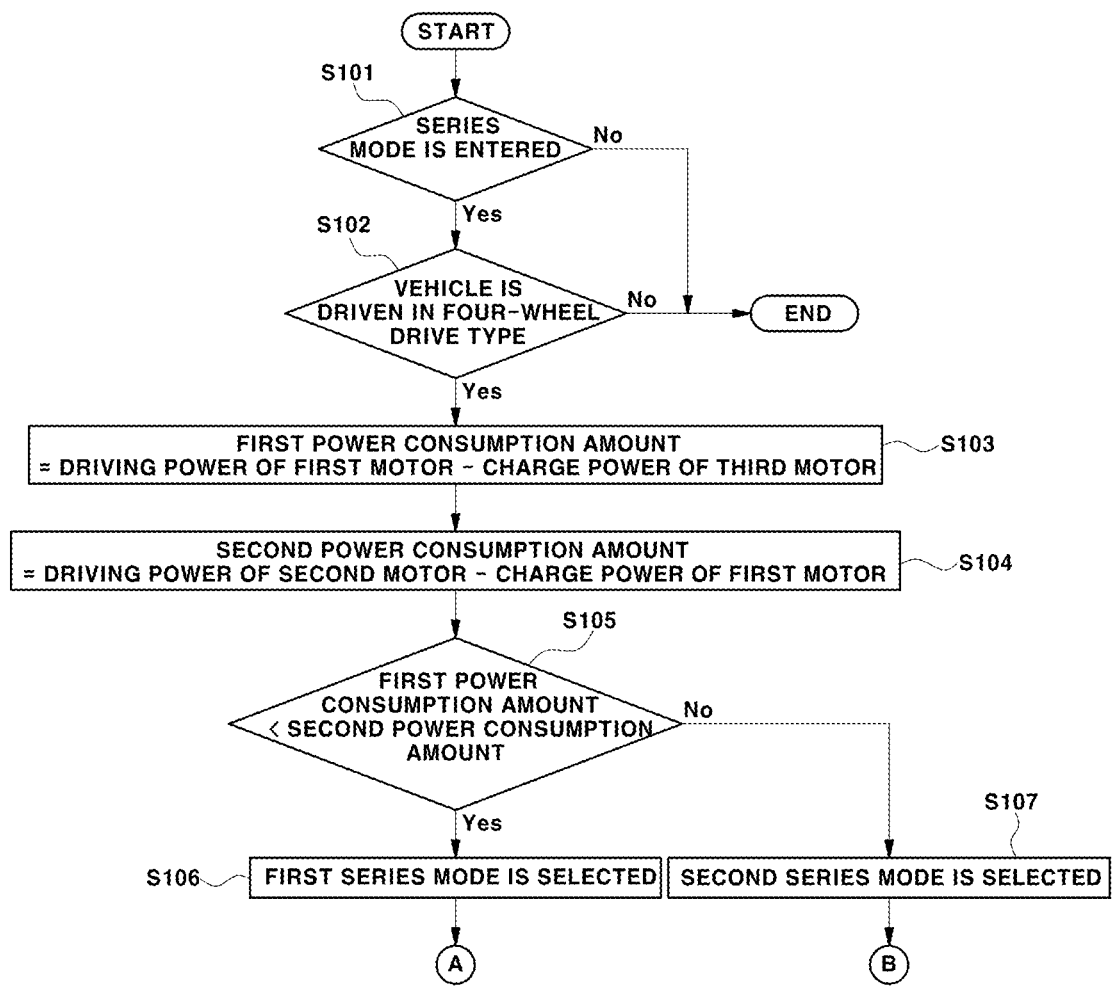
FIG. 4, FIG. 5, and FIG. 6 are flowcharts sequentially showing a control process for a driving series mode of a hybrid vehicle according to an exemplary embodiment of the present disclosure.
Figure 5:
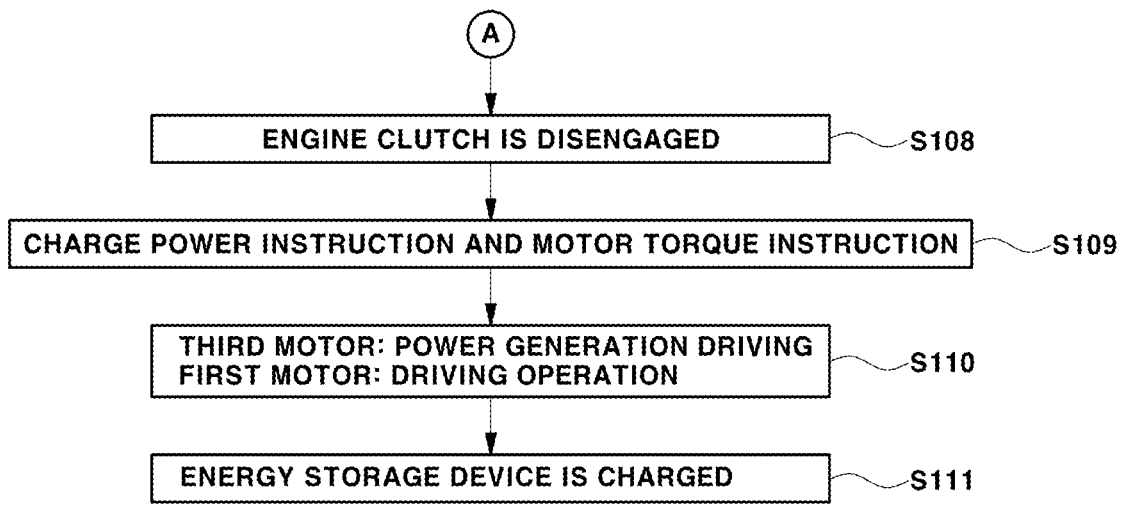
Figure 6:
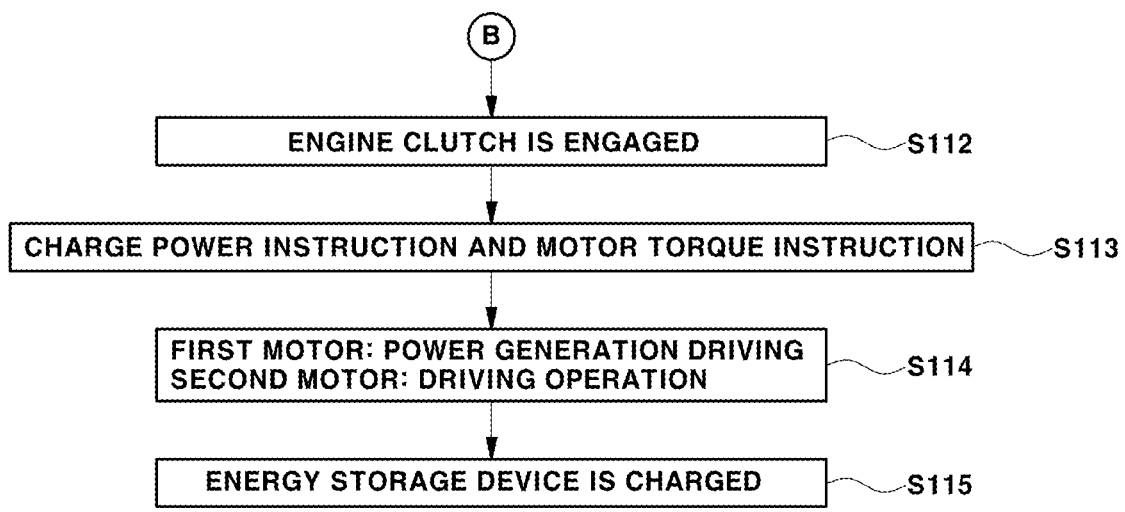

FIG. 4, FIG. 5, and FIG. 6 are flowcharts sequentially showing a control process for a driving series mode of a hybrid vehicle according to an exemplary embodiment of the present disclosure.

First, whether to enter a series mode is determined while a hybrid vehicle including a four-wheel drive powertrain is driven (S101).

For example, when the state of charge (SOC) value of a battery employed as the energy storage device 80 reaches a reference remaining level, which requires charging, and the battery controller 140 transmits a battery charge request signal to the hybrid control unit 100 while a hybrid vehicle including a four-wheel drive powertrain is driven is driven, the hybrid control unit 100 may determine to enter a series mode in which a battery is charged with power from an engine and a vehicle is driven by power from a motor.

Next, when it is determined to enter the series mode, it is checked whether the hybrid vehicle including a four-wheel drive powertrain is being driven in a four-wheel drive type (S102).

The reason of checking whether the hybrid vehicle is being driven in four-wheel drive type is because the control process of the hybrid control unit 100, which selects the first series mode in which the driving forces of the first motor 21 and the third motor 23 are used besides the driving force of the engine 10 or the second series mode in which the driving forces of the first mode 21 and the second mode 22 are used besides the driving force of the engine 10, may be performed in the four-wheel drive state in which the first motor 21 for front wheels and the second mode 22 for rear wheels are both driven.

Next, when it is determined that the hybrid vehicle including a four-wheel drive powertrain is being driven in a four-wheel drive type, a step of determining a first power consumption amount and a second power consumption amount is performed.

That is, the hybrid control unit is configured to determine a first power consumption amount according to driving of the first motor 21 and the third motor 23 to select the first series mode and determines the second power consumption amount according to driving of the first motor 21 and the second motor 22 to select the second series mode under the driving condition that the engine of the vehicle is driven.

The first power consumption amount may be substituted by a first energy efficiency when the first motor and the third motor are driven, and the second power consumption amount may be substituted by second energy efficiency when the first motor and the second motor are driven.

The first power consumption amount may be determined as a value obtained by subtracting charge power of the third motor from driving power of the first motor [driving power of first motor−charge power of third motor] (S103).

The driving power of the first motor may be obtained from the following equation 1 for each shifting range of a transmission.

driving power of first motor=[(wheel request power/
vehicle speed)+(non-load drag of reducer+non-
load drag of second motor)]×rpm of first motor/
(transmission efficiency×driving efficiency of
first motor)                                    (equation 1):

In the equation 1, the wheel request power is power which is required to drive a vehicle at a current shifting range in accordance with driver request power, and not only the non-load drags of the reducer and the second motor, but the transmission efficiency, the driving efficiency of the first motor, etc. are values determined in advance through tests.

The charge power of the third motor may be determined based on engine driving torque.

That is, the engine driving torque is determined by the desired charging power in the vehicle, and the power generation of the third motor is driven according to the determined engine driving torque, so that the charging power of the third motor may be determined.

The second power consumption amount may be determined as a value obtained by subtracting charge power of the first motor from driving power of the second motor [driving power of second motor−charge power of first motor] (S104).

The driving power of the second motor may be obtained from the following equation 2.

driving power of second motor=[(wheel request
power/vehicle speed)+(non-load drag of trans-
mission)]×rpm of second motor/(reducer effi-
ciency×driving efficiency of second motor)      (equation 2):

In the equation 2, the wheel request power is power which is required to drive a vehicle in accordance with driver request power, and not only the non-load drag of the transmission, but the reducer efficiency, the driving efficiency of the second motor, etc. are values determined in advance through tests.

The charge power of the first motor may be determined based on engine driving torque.

That is, the engine driving torque is determined by the desired charging power in the vehicle, and the power generation of the first motor is driven according to the determined engine driving torque, so that the charging power of the first motor may be determined.

Next, the first power consumption amount determined in step S103 and the second power consumption amount determined in step S104 are compared (S105).

That is, the hybrid control unit 100 compares the first power consumption amount which is a value obtained by subtracting the charge power of the third motor from the driving power of the first motor and the second power consumption amount which is a value obtained by subtracting the charge power of the first motor from the driving power of the second motor.

In other words, because the first power consumption amount is a value which is substituted by first energy efficiency when the first motor and the third motor are driven, and the second power consumption amount is a value which is substituted by second energy efficiency when the first motor and the second motor are driven, the first power consumption amount and the second power consumption amount may be compared or the first energy efficiency or the second energy efficiency may be compared.

As the result of comparison, when the first power consumption amount is smaller than the second power consumption amount or when the first energy efficiency is higher than the second energy efficiency, the first series mode is selected and performed (S106), and when the second power consumption amount is smaller than the first power consumption amount or when the second energy efficiency is higher than the first energy efficiency, the second series mode is selected and performed (S107).

In other words, the hybrid control unit 100 determines to perform the first series mode when the first power consumption amount, which is a value obtained by subtracting the charge power of the third motor from the driving power of the first motor, is smaller than the second power consumption amount, which is a value obtained by subtracting the charge power of the first motor from the driving power of the second motor, or when the first energy efficiency is higher than the second energy efficiency. On the other hand, the hybrid control unit 100 determines to perform the second series mode when the second power consumption amount, which is a value obtained by subtracting the charge power of the first motor from the driving power of the second motor, is smaller than the first power consumption amount, which is a value obtained by subtracting the charge power of the third motor from the driving power of the first motor, or when the second energy efficiency is higher than the first energy efficiency.

When it is determined to perform the first series mode, the energy storage device 80 is charged by power generation operation of the third motor 23 using an idling driving force of the engine 10 and simultaneously the vehicle is driven by a driving force from the first motor with the engine clutch 12 disengaged.

To the present end, the hybrid control unit 100 or the engine control unit 110 performs control of disengaging the engine clutch 12 (S108), and the hybrid control unit 100 gives a charge power instruction to the power generation controller 130 and simultaneously gives a motor torque instruction for driving to the motor controller 120 (S109).

Accordingly, as the first series mode, the third motor 23 is controlled to perform power generation operation and output the instructed charge power by the power generation controller 130 and the first motor 21 is controlled to be driven at the provided motor torque for driving by the motor controller 120 (S110).

In the present process, the second motor 22 and the reducer 50 are maintained in a non-load drag state in which they are rotated without torque applied.

Accordingly, the power generated by power generation operation of the third motor 23 may be easily accumulated in the energy storage device 90 (S111).

In other words, while the first series mode is performed, power from the first motor 21 is transmitted to the front wheels 40 through the transmission 30 with the engine clutch 12 disengaged (see the driving line in FIG. 1), so that the vehicle is driven, and simultaneously, power generated by driving of the engine 10 is transmitted to the third motor 23 and the third motor 23 is driven as a generator, whereby the power generated by the third motor may be easily accumulated in the energy storage device 80 (see the charging line in FIG. 1).

On the other hand, when it is determined to perform the second series mode, the energy storage device 80 is charged by power generation operation of the first motor 21 using a driving force of the engine 10 and simultaneously the vehicle is driven by a driving force from the second motor with the engine clutch 12 engaged.

To the present end, the hybrid control unit 100 or the engine control unit 110 performs control of engaging the engine clutch 12 (S112), and the hybrid control unit 100 gives a charge power instruction and a motor torque instruction for driving to the motor controller 120 (S113).

Accordingly, as the second series mode, the first motor 21 for front wheels is controlled to perform power generation operation and output the instructed charge power by the motor controller 120 and simultaneously the second motor 22 for rear wheels is controlled to be driven at the instructed motor torque for driving by the motor controller 120 (S114).

Accordingly, the power generated by power generation operation of the first motor 21 may be easily accumulated in the energy storage device 90 (S115).

In other words, while the first series mode is performed, power from the second motor 22 is transmitted to the rear wheels 60 through the reducer 50 with the engine clutch 12 engaged (see the driving line in FIG. 3), so that the vehicle is driven, and simultaneously, power generated by driving of the engine 10 is transmitted to the first motor 21 and the first motor 21 is driven as a generator, whereby the power generated by the first motor 21 may be easily accumulated in the energy storage device 80 (see the charging line in FIG. 3).

When the second series mode is performed, the first motor 21 performs power generation operation, so that the transmission 30 connected to the output shaft of the first motor 21 stays in a non-load drag state at the N-stage.

As described above, because the first series mode or the second series mode, in which driving and charging are differently performed, depending on a power consumption amount which is determined in accordance with driver request power, charge power for the energy storage device, driving efficiency of a motor, a non-load drag, etc., may be selected, it is possible to provide a series mode which is suitable for a four-wheel drive powertrain of a hybrid vehicle and can further improve charging efficiency.

Furthermore, the term related to a control device such as "controller", "control apparatus", "control unit", "control device", "control module", or "server", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A control method for driving a series mode of a hybrid vehicle including an engine and a first motor configured for driving front wheels of the hybrid vehicle, an engine clutch disposed between the engine and the first motor, a second motor configured for driving rear wheels of the hybrid vehicle, and a third motor configured for power generation operation connected to the engine, the method comprising:
   determining, by a control unit, whether to enter the series mode when the hybrid vehicle is driven;
   determining, by the control unit, a first power consumption amount or a first energy efficiency according to driving of the first motor and the third motor, and a second power consumption amount or a second energy efficiency according to driving of the first motor and the second motor; and
   selecting and performing, by the control unit, one of a first series mode that utilizes the driving of the first motor and the third motor or a second series mode that utilizes the driving of the first motor and the second motor by comparing the first power consumption amount and the second power consumption amount or comparing the first energy efficiency and the second energy efficiency,
   wherein the first series mode performs that an energy storage device is charged by power generation operation of the third motor using an idling driving force of the engine and simultaneously the vehicle is driven by a driving force from the first motor with the engine clutch disengaged, and
   wherein the second series mode performs that the energy storage device is charged by power generation operation of the first motor using a driving force from the engine and simultaneously the vehicle is driven by a driving force from the second motor configured for driving the rear wheels with the engine clutch engaged, depending on an energy efficiency and a power consumption amount that are determined based on driver request power and charge power for the energy storage device.

2. The control method of claim 1, wherein the first series mode that utilizes the driving of the first motor and the third motor is selected and performed when the first power consumption amount is smaller than the second power consumption amount or when the first energy efficiency is higher than the second energy efficiency.

3. The control method of claim 1, wherein the second series mode that utilizes the driving of the first motor and the second motor is selected and performed when the second power consumption amount is smaller than the first power consumption amount or when the second energy efficiency is higher than the first energy efficiency.

4. The control method of claim 1, further including checking, by the control unit, whether the hybrid vehicle is driven in a four-wheel drive type before the determination of the first power consumption amount or the first energy efficiency and the second power consumption amount or the second energy efficiency, when it is determined by the control unit to enter the first series mode.

5. The control method of claim 4, wherein the determination of the first power consumption amount or the first energy efficiency and the second power consumption amount or the second energy efficiency is performed when the hybrid vehicle is being driven in the four-wheel drive type.

6. The control method of claim 1, wherein the first power consumption amount is determined as a value obtained by subtracting charge power of the third motor from driving power of the first motor.

7. The control method of claim 6, wherein the driving power of the first motor is obtained for each gear of a transmission from Equation 1: driving power of first motor=[(wheel request power/vehicle speed)+(non-load drag of reducer+non-load drag of second motor)]×rpm of first motor/(transmission efficiency×driving efficiency of first motor).

8. The control method of claim 6, wherein the charge power of the third motor is differently determined in accordance with an engine driving torque.

9. The control method of claim 1, wherein the second power consumption amount is determined as a value obtained by subtracting charge power of the first motor from driving power of the second motor.

10. The control method of claim 9, wherein the driving power of the second motor is obtained from Equation 2: driving power of second motor=[(wheel request power/vehicle speed)+(non-load drag of transmission)]×rpm of second motor/(reducer efficiency×driving efficiency of second motor).

11. The control method of claim 9, wherein the charge power of the first motor is differently determined in accordance with an engine driving torque.

12. The control method of claim 1, wherein as the first series mode is performed, the energy storage device is charged by power generation operation of the third motor using an idling driving force of the engine and simultaneously the hybrid vehicle is driven by a driving force from the first motor with the engine clutch disengaged.

13. The control method of claim 12, wherein when the first series mode is performed, the second motor and a reducer are maintained in a non-load drag state.

14. The control method of claim 1, wherein as the second series mode is performed, the energy storage device is charged by power generation operation of the first motor using a driving force of the engine and simultaneously the hybrid vehicle is driven by a driving force from the second motor with the engine clutch engaged.

15. The control method of claim 14, wherein when the second series mode is performed, a transmission connected to an output shaft of the first motor is maintained in a non-load drag state at an N-stage.

16. A non-transitory computer readable storage medium on which a program for performing the method of claim 1 is recorded.

17. A vehicle of controlling a driving series mode thereof, the vehicle comprising:
   an engine;
   a first motor configured for driving front wheels of the vehicle;
   a second motor configured for driving rear wheels of the vehicle;
   a third motor configured for power generation operation connected to the engine; and a controller electrically connected to the engine, the first motor, the second motor and the third motor, wherein the controller is configured for:
   determining whether to enter the series mode when the vehicle is driven;
   determining a first power consumption amount or a first energy efficiency according to driving of the first motor and the third motor, and a second power consumption amount or a second energy efficiency according to driving of the first motor and the second motor; and
   selecting and performing one of a first series mode that utilizes the driving of the first motor and the third motor or a second series mode that utilizes the driving of the first motor and the second motor by comparing the first power consumption amount and the second power consumption amount or comparing the first energy efficiency and the second energy efficiency, wherein the first series mode is that an energy storage device is charged by power generation operation of the third motor using an idling driving force of the engine and simultaneously the vehicle is driven by a driving force from the first motor with the engine clutch disengaged, and the second series mode is that the energy storage device is charged by power generation operation of the first motor using a driving force from the engine and simultaneously the vehicle is driven by a driving force from the second motor configured for driving the rear wheels with the engine clutch engaged, depending on an energy efficiency and a power consumption amount that are determined based on driver request power and charge power for the energy storage device.

18. The vehicle of claim 17, wherein the controller is configured to select and perform the first series mode that utilizes the driving of the first motor and the third motor when the first power consumption amount is smaller than the second power consumption amount or when the first energy efficiency is higher than the second energy efficiency.

19. The vehicle of claim 17, wherein the controller is configured to select and perform the second series mode that utilizes the driving of the first motor and the second motor when the second power consumption amount is smaller than the first power consumption amount or when the second energy efficiency is higher than the first energy efficiency.

20. A control method for driving series mode of a hybrid vehicle including an engine and a first motor configured for driving front wheels of the hybrid vehicle, an engine clutch disposed between the engine and the first motor, a second motor configured for driving rear wheels of the hybrid vehicle, and a third motor configured for power generation operation connected to the engine, the method comprising:
   determining, by a control unit, whether to enter the series mode when the hybrid vehicle is driven;
   determining, by the control unit, a first power consumption amount or a first energy efficiency according to driving of the first motor and the third motor, and a second power consumption amount or a second energy efficiency according to driving of the first motor and the second motor; and
   selecting and performing, by the control unit, one of a first series mode that utilizes the driving of the first motor and the third motor or a second series mode that utilizes the driving of the first motor and the second motor by comparing the first power consumption amount and the second power consumption amount or comparing the first energy efficiency and the second energy efficiency,
wherein the hybrid control unit determines to perform the first series mode when the first power consumption amount, which is a value obtained by subtracting the charge power of the third motor from the driving power of the first motor, is smaller than the second power consumption amount, which is a value obtained by subtracting the charge power of the first motor from the driving power of the second motor, or when the first energy efficiency is higher than the second energy efficiency.

* * * * *